United States Patent [19]

Gaines, Jr. et al.

[11] 4,389,341

[45] Jun. 21, 1983

[54] FUGITIVE BINDER-CONTAINING NUCLEAR FUEL MATERIAL AND METHOD OF PRODUCTION

[75] Inventors: George L. Gaines, Jr., Scotia; William J. Ward, III, Schenectady, both of N.Y.

[73] Assignee: General Electric Company, Schenectady, N.Y.

[21] Appl. No.: 273,900

[22] Filed: Jun. 15, 1981

[51] Int. Cl.³ .......................... C09K 3/00; G21C 21/00
[52] U.S. Cl. ................................. 252/638; 252/643; 260/429.1; 264/0.5; 423/253; 423/261
[58] Field of Search ................. 252/638, 643; 264/0.5; 423/253, 261

[56] References Cited

U.S. PATENT DOCUMENTS 3,966,872 6/1976 Sundar et al. .................. 423/253
4,035,468 7/1977 Craigen et al. ................. 423/253
4,061,700 12/1977 Gallivan ......................... 264/0.5

FOREIGN PATENT DOCUMENTS 844407 8/1960 United Kingdom ............. 423/253

Primary Examiner—Leland A. Sebastian
Attorney, Agent, or Firm—Leo I. MaLossi; James C. Davis, Jr.; James Magee

[57] ABSTRACT

A nuclear fuel material green body of density from about 30 to 70% of theoretical density having tensile strength and plasticity adequate to maintain the integrity of the body during processing leading to ultimate sintered condition is produced by adding one or more amines to a particulate mass of the nuclear fuel containing about five percent of ammonium uranyl carbonate under conditions resulting in reaction of the amine with the ammonium uranyl carbonate, liberation of ammonia and formation of a water-soluble uranyl compound more effective as a binder than the ammonium uranyl carbonate.

13 Claims, 2 Drawing Figures

FUGITIVE BINDER-CONTAINING NUCLEAR FUEL MATERIAL AND METHOD OF PRODUCTION

FIELD OF THE INVENTION

The present invention relates generally to the ceramic art and production of sintered bodies of non-metallic powders, and is more particularly concerned with a new nuclear fuel powder-binder mixture and green bodies made of such mixtures of unique physical properties, and is further concerned with a novel method of producing these new powder mixtures and green bodies thereof.

BACKGROUND OF THE INVENTION

Various materials are used as nuclear fuels for nuclear reactors including ceramic compounds of uranium, plutonium and thorium with particularly preferred compounds being uranium oxide, plutonium oxide, thorium oxide and mixtures thereof. An especially preferred nuclear fuel for use in nuclear reactors is uranium dioxide.

Uranium dioxide is produced commercially as a fine, fairly porous powder which cannot be used directly as nuclear fuel. It is not a free-flowing powder, but clumps and agglomerates, making it difficult to pack in reactor tubes to the desired density.

The specific composition of a given commercial uranium dioxide powder may also prevent it from being used directly as a nuclear fuel. Uranium dioxide is an exception to the law of definite proportions since "$UO_2$" actually denotes a single, stable phase that may vary in composition from $UO_{1.7}$ to $UO_{2.25}$. Because thermal conductivity decreases with increasing O/U ratios, uranium dioxide having as low an O/U ratio as possible is preferred. However, since uranium dioxide powder oxidizes easily in air and absorbs moisture readily, the O/U ratio of this powder is significantly in excess of that acceptable for fuel.

A number of methods have been used to make $UO_2$ suitable as nuclear fuel. Presently, the most common method is to die press the powder into cylindrically-shaped green bodies of specific size.

The various organic or plastic binders that are commonly used for purposes of promoting the production of compacts of powdered materials in preparation for sintering are, however, not useful in application to nuclear fuel because they tend to contaminate the interior of the sintered body with impurities such as hydrides. These binders are normally converted to gases during the sintering step and the gases must be removed requiring special apparatus or procedures. Further, on decomposition, prior art binder materials usually leave deposits of organic substances in the equipment used to sinter the article, complicating maintenance of that equipment. Still further, conventional carbon-base binders would leave a carbon residue in nuclear fuel because they are fired in a reducing atmosphere in which polymeric materials are pyrolyzed.

To a considerable degree, these shortcomings of the prior art have been met and overcome through the invention disclosed and claimed in U.S. Pat. No. 4,061,700, granted to Gallivan on Dec. 6, 1977, and assigned to the assignee hereof. In accordance with that invention, a binder of ammonium uranyl carbonate or corresponding bicarbonate or carbamate is employed to hold the green body or compact together through the handling and processing to the final sintered stage. In more specific terms, green bodies or compacts are produced in accordance with that invention by contacting a particulate mass of $UO_2$, for example, with ammonium bicarbonate and producing thereby a uniform mixture containing about five percent ammonium uranyl carbonate which following compaction is of density of about 30 to 70% of theoretical, but may be as high as 90%, depending upon the pressing force applied in producing the compact. When formed in a conventional batch pressing operation such as that involving an hydrometallurgical press, these green bodies are strong enough to result in relatively high yields of acceptable products. They cannot withstand nearly as well, however, the force conditions involved in continuous production rotary press operations.

SUMMARY OF THE INVENTION

We have found that nuclear fuel green bodies of relatively high tensile strength can be produced consistently. We have further found that this result can be obtained through the use of moderate compacting pressures of 20,000 lbs. per square inch (20 kpsi). Still further, we've discovered that the resulting compacts because of their very high tensile strengths or because of their unusual combination of high tensile strength and substantial plasticity can be produced in high yields in continuous operations involving the use of rotary presses. These advantages are gained, however, without substantial processing complication or product cost increase and without incurring any other offsetting significant disadvantage.

In essence, our invention centers in the concept of adding an amine to nuclear fuel containing ammonium uranyl carbonate, bicarbonate or carbamate under conditions such that there is a reaction resulting in the formation of a water-soluble uranyl compound which is more advantageous as a binder for the particulate nuclear fuel material than the said ammonium uranyl compound. Preferably, the amine is a multifunctional primary amine and the reaction of this invention is effected by contacting the amine compound with a particulate mixture of nuclear fuel material prepared as described in the aforesaid patent. We believe the resulting compound to be the amine corresponding to the original ammonium compound because ammonia is liberated in approximate proportion to the amine addition in each instance. In any event, however, the ultimate result is a binder substantially more effective for continuous production, as by rotary press operation.

We have found that conditions favoring this reaction are standard conditions including room temperature and humidity and atmospheric pressure, although sometimes moderate heating may be preferable, particularly where the amine compound is a solid at room temperature or where the ammonia-liberating reaction otherwise proceeds too slowly.

We have further found that an excess of amine over that required for complete ammonia displacement and formation of the more effective binder reaction product can be detrimental to tensile strength and plasticity properties of the resulting nuclear fuel material green body compacts. Thus, for instance as set out below, even a small excess of ethylene diamine added to uranium dioxide powder containing ammonium uranyl carbonate resulted in compacts having no plasticity and tensile strength less than compacts of the same powder without amine addition.

In general, in its method aspect, this invention includes as a key step reacting the ammonium uranyl compound with an amine compound and forming *in situ* in the particulate mixture a water-soluble uranyl compound of substantially increased effectiveness as a binder. This step precedes pressing the particulate mixture to form a compact of nuclear fuel pellet size and shape for ultimate sintering. Further, this step involves bringing the amine compound reagent in liquid, solid or gaseous form, into contact with the nuclear fuel particulate or powder mixture through which ammonium uranyl carbonate or equivalent is uniformly distributed on the surfaces of the individual grains. As indicated above, the process conditions are those favoring the ammonia displacement reaction so that at least 35% of the ammonia of the ammonium uranyl compound is released, being presumably replaced in that compound by the amine. In the best practice of this invention, the amount of amine added will be such that there is substantially no unreacted amine residue in the powder mixture on cessation of ammonia release.

Likewise stated in general terms, in its composition of matter aspect, the nuclear fuel particulate material of this invention comprises a mixture of nuclear fuel powder and a minor amount of a water-soluble uranyl compound other than ammonium uranyl carbonate, bicarbonate or carbamate. This minor constituent, which is the reaction product of amine and ammonium uranyl carbonate or equivalent, serves the function of a superior binder in compacts of the powder mixture and is present in an amount from about 0.5 to 7% and preferably, as previously indicated, is a derivative of a multifunctional primary amine or mixture of two or more of them.

In its article of manufacture aspect, this invention briefly described, comprises a green body or compact of nuclear fuel in the form of a pellet composed of nuclear fuel particulate material, such as $UO_2$, bound together with a minor amount of a water-soluble uranyl compound which is superior as a binder in this mixture to ammonium uranyl carbonate, bicarbonate or carbamate. As stated above, the compact contains from about 0.5 to 7% of this superior binder, preferably a derivative of a multifunctional primary amine. Again, in the best practice of this invention, the compact, like the particulate material of which it is made, contains substantially no residual unreacted amine.

DETAILED DESCRIPTION OF THE INVENTION

Figure 1:
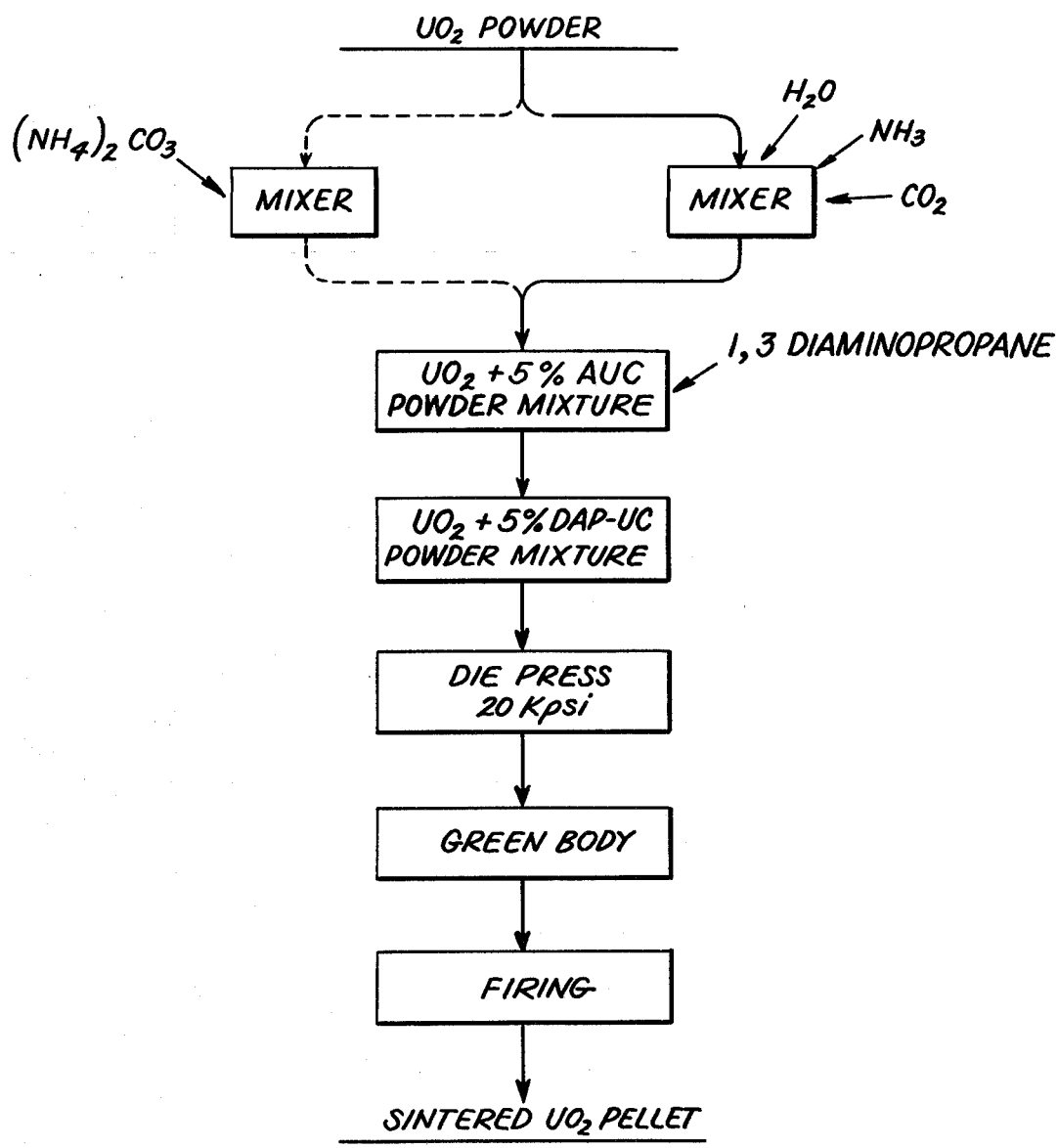
FIG. 1 is a flow sheet diagram illustrating the method of this invention including alternative preliminary steps of providing ammonium uranyl carbonate in admixture with a major proportion of $UO_2$ powder either by treating $UO_2$ powder with gases or by mixing ammonium bicarbonate with the powder.

As shown in the accompanying flow sheet of FIG. 1, it is our preference in the practice of this invention to prepare a mixture of $UO_2$ powder containing ammonium uranyl carbonate by forming the latter *in situ* by contacting the powder with ammonia, carbon dioxide and water vapor under conditions favoring reaction to produce the desired product in uniform distribution through the powder body. The resulting mixture is designated "treated powder" in this specification. Alternatively, by proceeding as indicated by the dotted lines of the diagram, one may provide the binder content required by adding ammonium bicarbonate in finely divided form and thoroughly mixing the powders together. Ammonium uranyl carbonate binder results after periods of up to ten days from reaction between the $UO_2$ powder and the added ammonium compound which, under standard conditions of temperature, pressure and humidity (i.e., 26° C., atmospheric pressure, 74% relative humidity) decomposes to ammonia, carbon dioxide, and water vapor, which then react with $UO_2$ to make ammonium uranyl carbonate on the surfaces of $UO_2$ grains. As the next step in the process, the resulting mixture is contacted with a suitable amine under conditions favoring reaction to effect displacement of the ammonia of the binder by the amine. This latter is a key novel step in this process and is essential to the consistent attainment of the new results and advantages detailed above. Our preference for this purpose is 1,3 diaminopropane which can be added as a liquid or vapor or even as a solid, but in accordance with our choice, is used in liquid form. The solid addition procedure involves freezing and crushing the amine compound to a fine powder and thoroughly mixing and blending the powders together so that the temperature of the amine rises to the point that the displacement reaction begins, as evidenced by evolution of ammonia from the mass. As another alternative, the amine may be evaporated and diffused into the powder to react with the ammonium compound and liberate ammonia therefrom.

While multifunctional primary amines are preferred in accordance with our practice of this invention, and are used singly, it will be understood that other amines may be used and that mixtures of amines are suitable for the purpose. Likewise, it will be understood that while 1,3 diaminopropane is favored, others of the class may, in some cases, be preferably because of commercial availability or for other practical reasons. Among those specially suited as alternatives at the present time are ethylene diamine, monomethylamine, 1,6 diaminohexane, and 1,7 diaminoheptane. In most of these cases, the operator has the choice of the form in which the amine compound is used. In the case of monomethylamine, however, alternatives are not as readily available because it is a gas at room temperture. Similarly, the heptane and hexane amines are solids at room temperature and are not readily used in vapor form.

Figure 2:
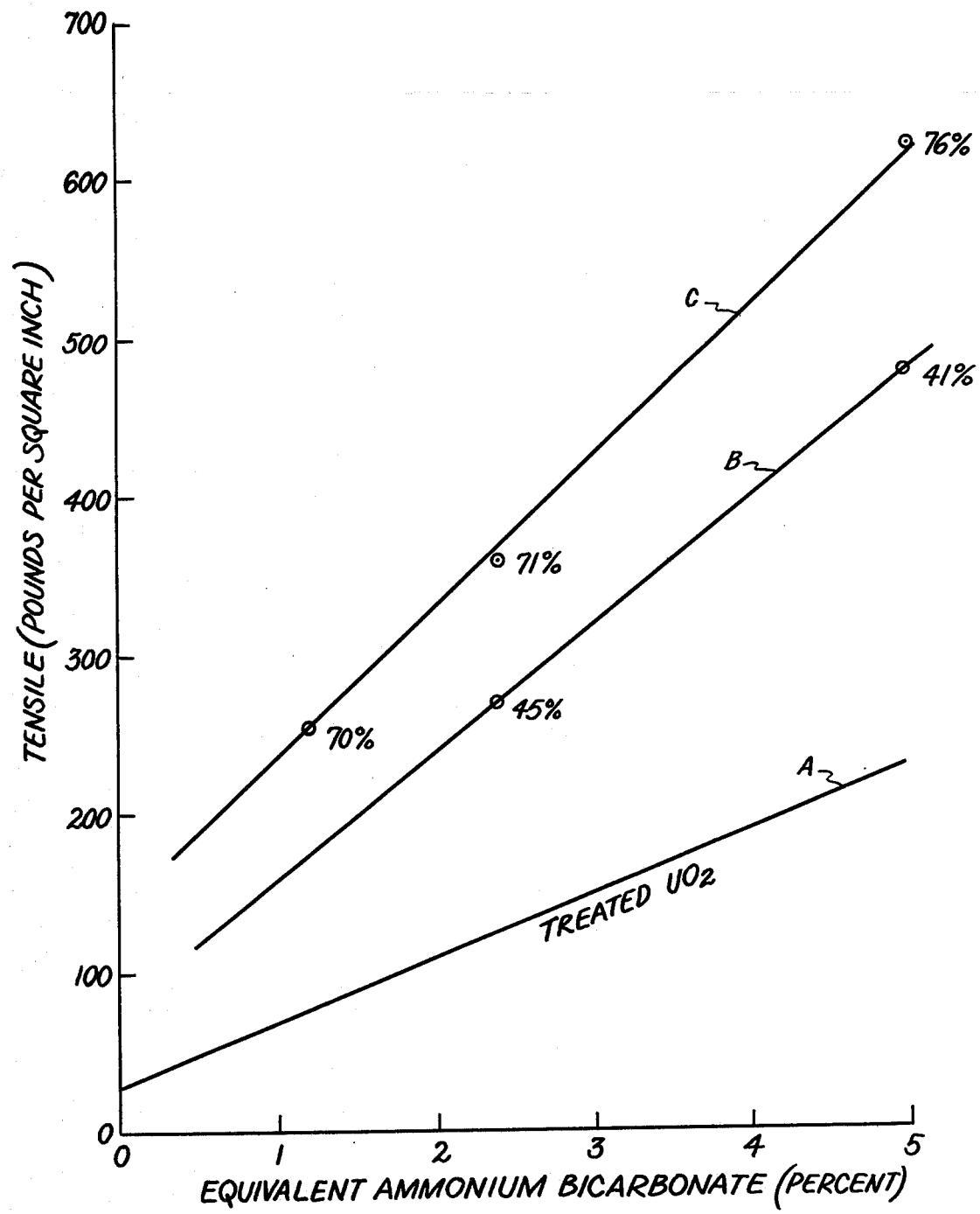
FIG. 2 is a chart on which tensile strength of $UO_2$ powder compact pressed at 20 kpsi is plotted against equivalent ammonium bicarbonate content of the powder as defined below, the three curves illustrating, respectively, an unconverted ammonium compound binder-powder mixture, a similar powder mixture in which about 45% of the ammonia of the ammonium uranyl carbonate has been displaced by the amine reaction, and another similar powder mixture in which the ammonia has thus been displaced to the extent of about 75%.

As illustrated by Curves B and C of FIG. 2, 1,3 diaminopropane gives outstanding pellet properties. Further, under standard conditions, it reacts rapidly to produce the ammonia displacement and a superior binder product in substantial proportion to the initial ammonium uranyl compound content of the treated powder or the $UO_2$ powder-binder mixture product of the ammonium bicarbonate addition alternatives indicated, respectively, by the solid lines and the dotted lines of the flow sheet of FIG. 1 Data represented by Curves A, B and C have been obtained by pressing the powder mixture in each instance at 20 kpsi and the tensile strength of each of the resulting green bodies in standard nuclear fuel pellet form has been measured in the usual manner. Thus, Curve B represents the data gathered in the course of testing pellets made by treating the powder of Curve A in accordance with this invention to substitute 1,3 diaminopropane for the ammonia of the binder to the extent of about 40 to 45%. Curve C, in turn, represents the data gathered in such tensile tests of pellets made of the powder of Curve A in which ammonia displacement by the same amine is of the order of 70 to 80%. Comparison of the results indicated by the Curves A, B and C shows that 75% displacement of ammonia in accordance with this invention results in a three-fold increase in tensile strength relative to the unsubstituted Curve A product, while 45% substitution provides more than a two-fold increase in the same property. Further, the relative effect of the amine reaction is slightly larger in the lower ranges of equivalent ammonium bicarbonate which is the quantity of ammonium bicarbonate that would have been added to $UO_2$ to form the amount of ammonium uranyl carbonate formed by the gas ($CO_2$, $NH_3$ $H_2O$) treatment. Tests run on pellets made of such treated $UO_2$ powder up to 37 days following the amine addition showed no change in their properties and such tests were not run beyond that point. The composition of the $UO_2$ powder and the preparation of it at the outset of the present process may advantageously be in accordance with the detailed disclosure set forth in the Gallivan patent, portions thereof dealing with these aspects of this process being hereby incorporated in their entirety in this specification by reference.

Further, it will be understood that in referring to nuclear fuel material, what we mean and intend is that defined in general and in detail in that prior disclosure which is incorporated herein by reference.

The novel features and advantages of this invention will be further evident from the following illustrative, but not limiting, examples of our actual practice:

EXAMPLE I

For a period of twenty hours, ammonia, carbon dioxide, water vapor and oxygen were flowed through a 500 gram mass of $UO_2$ powder. Ambient conditions during this run were maintained at 26° C., 74% humidity and atmospheric pressure and the gas flow rates in liters per minute were essentially constant, as follows:

| | | |
|---|---|---|
| $NH_3$ | 0.12 | |
| $CO_2$ | 0.09 | |
| $O_2$ | 4.6 | |

At the end of this run, the weight of the mass was found to have increased 4.8% due to formation of ammonium uranyl carbonate. The same amount of ammonium uranyl carbonate formation would have resulted from addition of 6.0% ammonium bicarbonate powder followed by aging up to ten days. Thus, the "equivalent" ammonium bicarbonate addition in this example is 6.0%. This treated powder was stored in a closed container for 2½ months after which the tensile strength of pellets made of that powder was estimated to have been 200 psi. While this value was not actually measured in this case, pellets made of similarly treated and aged powder had that tensile strength by actual measurement.

Ethylene diamine vapor was passed through this powder by bubbling oxygen at 1 liter per minute through pure ethylene diamine at 22° C.; and then through 500 grams of the treated powder for 3½ hours. This was followed by pure oxygen at 1 liter per minute for 5 minutes to flush unreacted ethylene diamine out of the treated powder bed. Following this treatment, the bed was found to have increased in weight by 0.85%. The tensile strength of pellets made by pressing the resulting powder at 20 kpsi was found to be 333 psi.

EXAMPLE II

One kilogram of $UO_2$ powder was treated with ammonia, carbon dioxide, water vapor and oxygen for 18 hours under the conditions described in Example I. The bed increased in weight 3.6% and pellets made by pressing the resulting treated powder at 20 kpsi had a tensile strength of 152 psi.

Without any aging, a 200 gram mass of the above treated powder was treated with ethylene diamine vapor by the procedure described in Example I to the extent that there was a weight increase of 1.23%. Pellets of standard size and shape made from the resulting treated powder by pressing at 20 kpsi had tensile strength approximating 366 psi.

The original, i.e. untreated, $UO_2$ powder used in the foregoing two examples gave pellets on pressing at 20 kpsi of tensile strength approximating 35 psi. Thus, the combined ammonia, carbon dioxide, water vapor and oxygen treatment and the ethylene diamine treatment resulted in approximately a ten-fold increase in tensile strength of the resulting green body product.

EXAMPLE III

In another experiment designed to test the utility of amines in liquid form in the process of this invention, ethylene diamine liquid was added in four one-half cubic centimeter increments to 50 grams of $UO_2$ powder prepared as described in Example I. The mixture was vigorously agitated and ammonia gas evolution was monitored until it ceased within several minutes. A ratio of 0.86 moles of ammonia liberated per mole of ethylene diamine added was observed. The tensile strength of the resulting powder measured in the usual manner after compaction was greater than 300 psi.

EXAMPLE IV

The special utility of 1,3 diaminopropane in the process of this invention was demonstrated in another experiment in which the amine in liquid form was added to treated $UO_2$ powder prepared as described in EXAMPLE I. Thus, as set out in EXAMPLE II, the amine was added in four increments each of one-half cubic centimeter to 50 grams of the powder. Five minutes later, the reaction being apparently complete as evidenced by cessation of ammonia evolution, the mixture was compacted at 20 kpsi to produce pellet-size green bodies for tests. The results of those tests are set out in the line opposite the fifth entry in Table B below.

EXAMPLE V

The aging characteristics of powder prepared in accordance with the description in EXAMPLE I were tested over a three-week period with the results indicated in TABLE A below:

TABLE A

AGING CHARACTERISTICS OF EDA TREATED UO₂ POWDER

| Time After EDA Treatment (days) | Tensile (psi) | f³* (microns) |
|---|---|---|
| 0 | 366 | 10–20 |
| 2 | 351 | 10–20 |
| 4 | 362 | 10–20 |
| 11 | 312 | 14–34 |
| 20 | 230 | 50–60 |

*f³ is the plasticity measure which is the distance travelled (in microns) by the Instron instrument test element after the pellet failed and before the applied force was less than 90% of the maximum.

EXAMPLE VI

The effectiveness of other amines and of 1,3 diaminopropane in various proportions used in accordance with the process of this invention was tested in an experiment using UO₂ powder prepared as described in EXAMPLE I, except that equivalent ammonium bicarbonate was variable. The results of this series of tests are set forth in TABLE B below, the data being obtained as described in the preceding examples as tensile tests and plasticity tests were made on compacts of the powders resulting from the treatments involved, as also previously described. As is also apparent from TABLE B for diaminopropane, there is a linear, but non-stoichiometric relationship between the amounts of amine added and ammonia displaced in the reaction of the process of this invention. The same linearity is expected for all of the amines tested.

TABLE B

| Amine | Equiv. ABC* % | % Amine | % NH₃ Displaced | Tensile (psi) | f³ | R** |
|---|---|---|---|---|---|---|
| Ethylene diamine | 5 | 4 | 85 | 340 | 0 | 0.86 |
| Monomethylamine | 5 | 1.7 | 84 | 280 | 0 | — |
| 3,3 diaminodipropylamine | 5 | 2 | 35 | 350 | 0 | 1.6 |
| 1,3 diaminopropane | 5 | 2 | 41 | 480 | 1–2 | 1.1 |
| 1,3 diaminopropane | 5 | 4.4 | 76 | 620 | 1–2 | 1.0 |
| 1,3 diaminopropane | 2.4 | 1.0 | 45 | 270 | 2–3 | 1.1 |
| 1,3 diaminopropane | 2.4 | 1.8 | 79 | 360 | 2–3 | 1.1 |
| 1,3 diaminopropane | 1.2 | 0.8 | 70 | 257 | 0 | 1.1 |
| 1,7 diaminoheptane | 0.5 | 2.5 | 29 | 430 | 0 | 1.1 |
| n butyl amine | 5 | 2.0 | 17 | 167 | 0 | 0.5 |
| 1,6 diaminohexane | 2.4 | 1.6 | 36 | 370 | 0 | 0.8 |
| Diethylene triamine | 5 | 2 | 29 | 280 | 0 | 1.0 |
| 3-Dimethylaminopropylamine | reacts only slightly with powder | | | | | |

*ABC is ammonium bicarbonate
**R is the ratio of moles of NH₃ displaced to moles of amine added.

The amines tested in this experiment were used in liquid, vapor or solid form as particularly suited to the purpose. Thus, monomethyl amine was used in form of a gas which was passed through the bed of treated UO₂ powder employed as a standard in each of the amine tests of TABLE B. The 1,7 diaminoheptane and the 1,6 diaminohexane were used in solid form, being mixed in powdered condition with the treated powder. The other amines were used in liquid form, being mixed with the treated powder as described above.

As indicated by the results set out in the experiments detailed above and particularly those of EXAMPLE VI, it is evident that the multifunctional primary amines have particular merit in application to this invention. Further, it will be understood that the 1,3 diaminopropane is possibly best suited for use in the practice of this invention because it reacts rapidly and yields outstanding pellet properties as illustrated in FIG. 2.

It will further be recognized, however that the 1,6 diaminohexane may be preferred for use because of its commercial availability and in spite of the fact that its use may require moderate heating (to about 60° C.) for complete reaction. From the foregoing general and specific description and the actual results of the experiments carried out as detailed in the foregoing examples, it will be understood that it is our preference in general to use multifunctional primary amines but that we also contemplate the use of monofunctional compounds of this type and, in fact, the amines in general which will yield consistently the new results and advantages of this invention. Further, it will be understood, particularly from the results set out in TABLE B, that it is our special preference to use an amine compound selected from the group consisting of 1,3 diaminopropane, 1,6 diaminohexane, 1,7 diaminoheptane, 3,3 diaminodipropylamine and ethylene diamine and mixtures thereof and that further, depending in general upon the amine chosen or the mixture of amines used and the equipment available, the amine may be in liquid, vapor or solid form in accordance with the description set out above or otherwise to produce the results of this invention.

EXAMPLE VII

To test the effects of an excess of amine over that required for complete ammonia removal from treated uranium dioxide powder 0.0401 mole of ethylene diamine was added to 50 grams of treated powder containing 0.0081 mole of (NH₄)₄UO₂(CO₃)₃. Evolution of 0.0326 mole of NH₃ was observed. For an R value of 0.86 mole NH₃ per mole of ethylene diamine, as previously determined, the addition of 0.0101 moles of ethylene diamine was 6% in excess of that required for complete NH₃ removal. Pellets made from the resulting powder in the manner described above had tensile strength of 96 psi and zero f³.

The results of the experiment of EXAMPLE VII indicate that as a practical matter in carrying out this invention process one should add an amount of amine to treated powder which is not more than 80 to 90% of that required for complete NH₃ removal. Compacts properties will improve up to 100% NH₃ removal, but further amine addition can cause marked deterioration in those same properties.

It will be understood by the term "nuclear fuel materials" as used herein, we mean and intend those materials as defined in the aforesaid Gallivan patent, this invention process being equally applicable to those materials independently and in any admixture, providing they contain ammonium uranyl carbonate or an equivalent material in which the amine substitution or displacement reaction of this invention will occur with the result that the reaction product is a water-soluble uranyl compound which is more effective as a binder for the particulate material than ammonium uranyl carbonate.

Throughout this specification and the appended claims, wherever percentages or proportions are designated, reference is to the weight basis.

We claim:

1. In the method of producing a sintered body of nuclear fuel material, including the steps of pressing a particulate mixture of nuclear fuel material and ammonium uranyl compound binder to form a green body compact and thereafter sintering the compact, the combination of the step prior to the pressing step of reacting the ammonium uranyl compound with an amine compound to displace ammonia and form in the mixture a water-soluble uranyl compound as a binder for the mixture.

2. The process of claim 1 in which the amine compound is selected from the group consisting of 1,3 diaminopropane, 1,6 diaminohexane, 1,7 diaminoheptane, monomethylamine and ethylene diamine and mixtures thereof.

3. The method of claim 1 in which the amine compound is 1,3 diaminopropane and in which the amine compound is added as a liquid to the particulate mixture and substantially uniformly distributed throughout the mixture on surfaces of individual particles of the nuclear fuel material.

4. The method of claim 1 in which the amine compound is 1,6 diaminohexane and in which the amine compound is added as a solid in finely-divided form and mixed with the particulate nuclear fuel material and in which the resulting mixture is then heated to 60° C. for about one-half hour to promote reaction of the amine compound and formation of water-soluble uranyl compound.

5. The method of claim 1 in which ethylene diamine in vapor form is contacted with the particulate nuclear fuel material and reacted with the ammonium uranyl compound binder with resulting formation of water-soluble uranyl compound.

6. Nuclear fuel particulate material having on the surface thereof an amount of water-soluble product of the reaction between an amine and ammonium uranyl carbonate, said amount being in the range of from about 0.5 to 7 percent by weight.

7. The nuclear fuel particulate material of claim 6 which contains residual ammonium uranyl compound.

8. A green body compact of nuclear fuel material in the form of a pellet of tensile strength and plasticity adequate to maintain pellet integrity during processing to ultimate sintered condition comprising nuclear fuel particulate material and from about 0.5 to 7 percent by weight of water-soluble uranyl compound as a product of the reaction between an amine and ammonium uranyl carbonate.

9. The green body compact product of claim 8 in which the water-soluble uranyl compound is present in the amount of about five percent by weight of the compact particulate mixture.

10. The green body product of claim 8 which contains residual ammonium uranyl compound.

11. The product of claim 8 which contains substantially no residual unreacted amine compound.

12. The method of producing a sintered body of nuclear fuel material composing the steps of incorporating ammonium uranyl compound in the nuclear fuel as a particulate mixture, adding an amine compound to the mixture in proportion less than the stoichiometric equivalent of the said ammonium uranyl compound, reacting the amine compound with said ammonium uranyl compound to displace ammonia and form a water-soluble uranyl compound as a binder for the mixture, pressing the resulting particulate material to form a green body compact in the form of a pellet, and firing the green body to produce a sintered pellet.

13. The method of claim 12 in which the amine is added in the amount of about 80% of that required to affect complete ammonia displacement from the ammonium uranyl compound.

* * * * *